United States Patent [19]

Fuerlinger et al.

[11] Patent Number: 4,730,302
[45] Date of Patent: Mar. 8, 1988

[54] MONITORING MEANS FOR DIGITAL SIGNAL MULTIPLEX EQUIPMENT

[75] Inventors: Franz Fuerlinger, Vienna; Albrecht Grabner, Ybbsitz; Werner Pokorny, Vienna; Walter Steiner, Poelten, all of Austria; Wilhelm Volejnik, Sauerlach, Fed. Rep. of Germany

[73] Assignee: Siemens Aktiengesellschaft, Berlin and Munich, Fed. Rep. of Germany

[21] Appl. No.: 920,190

[22] Filed: Oct. 17, 1986

[30] Foreign Application Priority Data

Oct. 17, 1985 [AT] Austria .................................. 3004/85

[51] Int. Cl.$^4$ .............................................. H04J 3/14
[52] U.S. Cl. .......................................... 370/13; 370/17
[58] Field of Search ........................ 370/13, 17, 102; 375/10; 371/22

[56] References Cited

U.S. PATENT DOCUMENTS

| 3,701,864 | 10/1972 | Marotte ................................. 370/13 |
| 4,091,240 | 5/1978 | Lainey et al. ......................... 370/17 |
| 4,103,108 | 7/1978 | Munter ................................. 370/17 |
| 4,112,264 | 9/1978 | Abramson ............................. 371/22 |

FOREIGN PATENT DOCUMENTS

86/06899 11/1986 PCT Int'l Appl. .

Primary Examiner—Douglas W. Olms
Attorney, Agent, or Firm—Hill, Van Santen, Steadman & Simpson

[57] ABSTRACT

In a switching location for TDM multiplexing of a combination of a plurality of channels for digital signals to form a common channel in one transmission direction and for demultiplexing a common transmission channel into a plurality of channels in the opposite transmission direction, the signals of the individual communications channels are combined to form pulse messages each of which is preceeded by a frame identifier word monitored by a monitoring memory with respect to its bit sequence and with respect to its periodicity. Double monitoring devices and one's density monitoring devices are provided for the input signals arriving via the individual communications channels. Potentially, code converter monitoring devices for the input and output signals are provided. A stepping bit monitoring device is provided for the input signals arriving via the individual communications channels. A level monitoring device is provided for the input signals arriving via the common communications channel. A frame clock monitoring device is provided for the common incoming transmission channel. A synchronism of the receiving device is monitored for the demultiplexer. Bit error monitoring is provided for the input signal of the demultiplexer. Frequency monitoring devices and level monitoring devices are provided for the output signals for the individual communications channels departing the apparatus.

4 Claims, 2 Drawing Figures

MONITORING MEANS FOR DIGITAL SIGNAL MULTIPLEX EQUIPMENT

BACKGROUND OF THE INVENTION

1. Field of the Invention

The present invention relates to a device for monitoring a switching location for time-division multiplexing a combination of a plurality of communications channels for digital signals, particularly for pulse code modulated (PCN) signals, to form a common transmission channel in one transmission direction and for demultiplexing a common transmission channel into a plurality of communications channels in the opposite transmission direction, whereby the signals of the individual communications channels are combined to form pulse messages, each of which is preceeded by a frame recognition word which is monitored by a monitoring memory both with respect to its bit sequence and with respect to its periodicity.

2. Description of the Prior Art

Equipment of the type generally set forth above for combining a plurality of communications channels into a single transmission channel by way of multiplexers and for the corresponding execution of the opposite switching events (demultiplexing) are frequently established in unmanned offices and at great distance from maintenance stations since a high degree of reliability of operation is generally guaranteed due to the utilization of integrated components. However, precisely because of the anticipated reliability, the necessity is established of creating quick evaluation in the case of a malfunction. This requires that the nature of the respective malfunction be rapidly perceived in order to be able to quickly replace the malfunctioning components and eliminate the malfunction.

Various measures have already become known in the art for malfunction recognition. In a switching location of the aforementioned type, which is usually under supervision of personnel having little training, what is involved is that all possible errors be easily perceived and capable of being easily eliminated.

SUMMARY OF THE INVENTION

It is therefore the object of the present invention to provide a practically gap-free monitoring system in a switching location of the type set forth which allows the faulty component or components to be immediately recognized.

The above object is achieved, according to the present invention, in that, in addition to a monitoring and error message device for the frame recognition word effective in both transmission directions, further error message devices are assigned to the following monitoring devices:

(a) Level mohitoring devices for the input signals arriving by way of individual communications channels;
(b) One's density monitoring devices for these input signals;
(c) Potentially, code converter monitoring devices for the input signals or, respectively, output signals arriving and departing by way of the communications channels;
(d) Stuffing bit rate monitoring device for the input signal arriving by way of the communications channels;
(e) Level monitoring device for the input signals arriving by way of the common transmission channel, connected to a monitoring device for the recovered clock;
(f) Frame clock monitoring means for the input signal from the common transmission channels;
(g) Monitoring device for monitoring the synchronization of the receive apparatus of the demultiplexer;
(h) Bit error monitoring device for the input signal of the demultiplexer;
(i) Frequency monitoring devices for the output signals departing by way of the individual communications channels; and
(j) Level monitoring devices for the output signals departing by way of the individual communications channels.

The selection of error message devices provided in the monitoring apparatus of the present invention is undertaken such that both the various causes of malfunction and the components to be replaced can be easily identified with the assistance of each individual error message and also with the assistance of all combinations of error messages.

BRIEF DESCRIPTION OF THE DRAWINGS

Other objects, features and advantages of the invention, its organization, construction, and operation will be best understood from the following detailed description, taken in conjunction with the accompanying drawings, on which.

DESCRIPTION OF THE PREFERRED EMBODIMENTS

Figure 1:
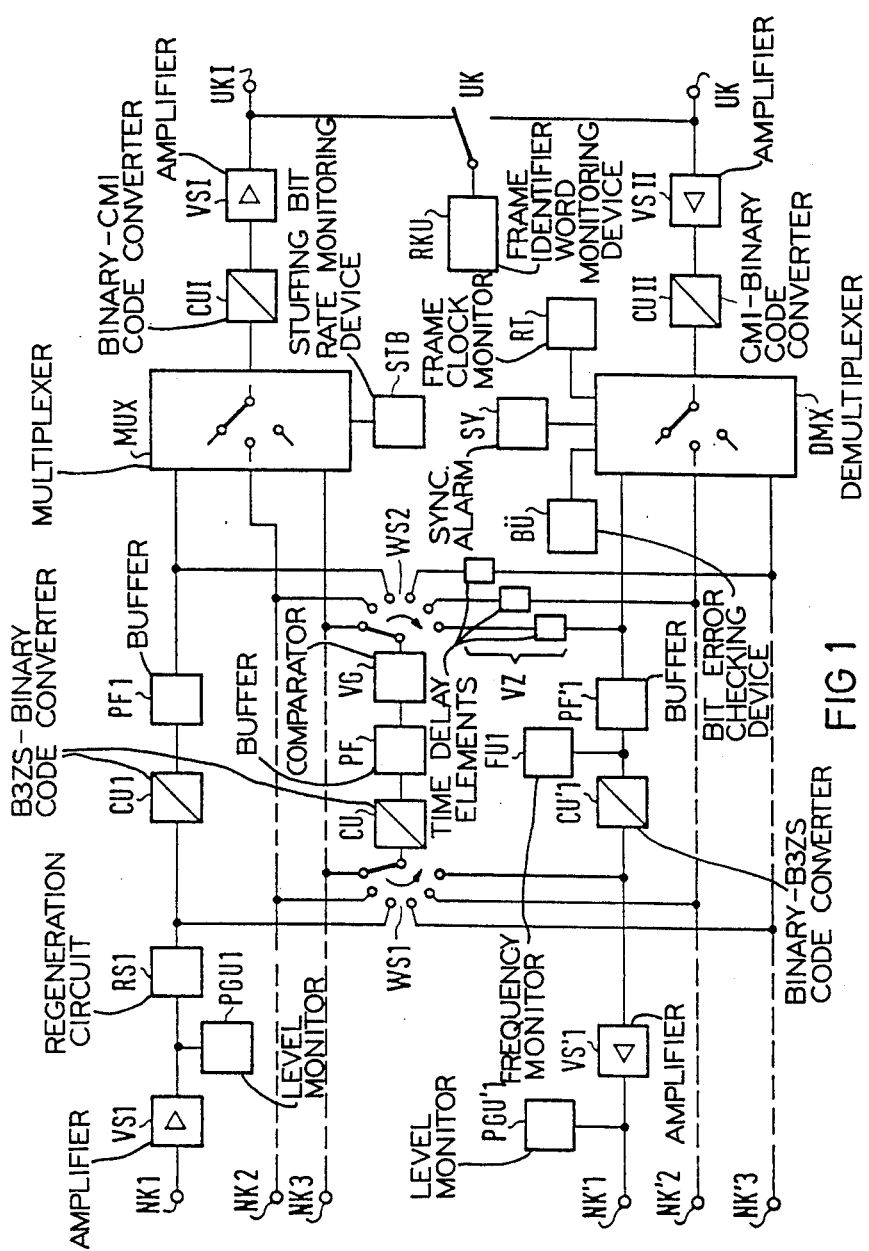
FIG. 1 is a schematic circuit diagram of the overall structure of apparatus constructed in accordance with the present invention.

Referring to FIG. 1, the circuit illustrated serves for TDM multiplexing a combination of three communications channels NK1, NK2 and NK3 for digital, particularly PCM signals to form a common transmission channel UK I in one transmission direction and for demultiplexing an oppositely-transmitted transmission UK II into three communications channels NK'1, NK'2 and NK'3 in the opposite transmission direction. The transmission system is suitable for the combination of systems having data rates deviating slightly from one another, whereby the differences are compensated by stuffing bits. Therefore, for example, it is assumed that the individual communications channels NK comprise bit rates of 45 Mbit/s and the common transmission channel UK I comprises a bit rate of 140 Mbit/s, whereby the bit balance 3×35+135 yields a difference of 5 Mbit/s which, for specific information and stuffing bits for the compensation of bit rates which derive from different frequency generators, in fact have nominally indentical frequencies, but nonetheless comprise slight deviations. The analogous balance occurs for the opposite transmission direction.

The embodiment of the invention illustrated in FIG. 1 relates to a circuit of digital transmission technology which converts the United States standard bit rate of 44.736 Mbit/s to the European standard bit rate 139.264 Mbit/s. The particulars in this regard relating to the United States bit rates and coding can be derived from "Bell Communications Research—Asynchronous Digital Multiplexer Requirements and Objectives", Dec. 1, 1984, pp. 2-4 and 2-5.

The corresponding particulars regarding the European bit rates are contained in "Yellow Book", Vol. III-Fasc. III.3 concerning "Digital Networks Transmission Systems and Multiplexing Equipment" of the CCITT, p. 55. For the purpose of simplifying the expressions, the designation "45 Mbit/s" shall be used in the following instead of 44.736 Mbit/s and the designation "140 Mbit/s" shall be employed instead of 139.264 Mbit/s. In accordance with the time-division multiplex method, the transmission multiplexer MUX groups three digital signals each of 45 Mbit/s to form a digital signal of 140 Mbit/s for the first transmission direction. The receiving demultiplexer DMX acquires three signals of 45 Mbit/s each from the incoming 140 Mbit/s signal for the transmission in the opposite direction. The three incoming 45 Mbit/s signals are transmitted via the communications channels NK1, NK2 and NK3 and, after grouping by the multiplexer MUX, are transmitted farther in the common 140 Mbit/s signal by way of the communications channel UK I. The 44 Mbit/s signals transmitted in the common 140 Mbit/s signal in the opposite direction via the transmission channel UK II are separated from one another via the demultiplexer DMX and are transmitted in the outgoing direction via the communications channels NK'1, NK'2 and NK'3. The 140 Mbit/s interfaces correspond to the CCITT recommendations and the 45 Mbit/s interfaces correspond to the U.S. standards set forth in the above-mentioned Bell publication.

The circuit of the present invention enables a plesiochronic operating mode, i.e., the 45 Mbit/s signals can be plesiochronic or synchronous relative to one another. The clock matching required given plesiochronic signals occurs in accordance with the positive stuffing method. Since, in this method, the bit rates of the receive signal receive their original values again after transmisssion, the circuit can also be utilized in synchronous digital networks.

The 45 Mbit/s signals incoming by way of the communications channels NK1, NK2 and NK3, as well as the outgoing signals via the communications channels NK'1, NK'2 and NK'3 are coded in the B3ZS code (bipolar with three-zero substitution), as set forth in "Bell Comm. Res.", pp. 2-5. This coding is similar to the bipolar method. The transmission signal also has the amplitude of zero for the signal "0" as long as the plurality of 2 "0" bits is not exceeded. However, when the same is exceeded, then the coding rule of the bipolar method is violated (bipolar violation) and a special pulse train is transmitted in order to avoid the continuous amplitude of "0" in the transmission signal. As a result thereof, maintaining the synchronization in the receiver is always possible even given longer streams of zeros. The synchronism, in particular, is achieved by way of a resonant circuit on the basis of a clock recovery from the received signal, and the resonant circuit would no longer experience excitation after a longer failure of a signal to arrive.

The 140 Mbit/s signal outgoing by way of the communications channel UK I and incoming via the communications channel UK II is coded in a CMI (coded mark inversion) code, as set forth in the "CCITT Yellow Book", p. 55. This is the binary code in which every characteristic state "0" of the binary code is coded in such a fashion that "−1" of the CMI code is generated during the first half of the characteristic state and "+1" is generated during the second half of the bit duration of the characteristic state, i.e., a positive signal edge arises in the center of the bit duration. The characteristic state of the binary code alternately converts into the characteristic state "+1" and into the characteristic state "−1" of the CMI code, whereby each of these two characteristic states is maintained during the entire bit duration. Just like the B2ZS code, the CMI code is free of DC.

Since both the multiplexer MUX and the demultiplexer DMX are set up for the reception of binary-coded signals at the input and also supply binary-signals at the output, the necessity of providing the following coding equipment derives.

The B3ZS-coded 45 Mbit/s signals incoming via the communications channels NK1, NK2 and NK3 are converted by respective code converters CU1 into binary-coded signals which are supplied to the input of the multiplexer MUX. The likewise binary-coded 140 Mbit/s output signals of the multiplexer MUX are converted into CMI-coded signals by the code converter CU I, the CMI-coded signals being supplied to the transmission channels UK I.

The reconversion of the CMI-coded 140 Mbit/s signals incoming on the transmission channel UK II occurs in the corresponding manner, these being first supplied to the code converter CU II and departing in a binary-coded condition as input signals for the demultiplexer DMX. After the division of the 140 Mbit/s signal into three 45 Mbit/s signals, the signals are separately supplied in binary-coded form to three code converters of which only the code converter CU'1 is shown. These code converters supply the three outgoing communications channels NK'1, NK'2 and NK'3 with signals converted into the B3ZS code.

The present invention enables a highly-surveyable and practically gap-free monitoring of the above-described circuit in that each of the individual sub-functions of the circuit is monitored per se, whereby the monitoring units are established such that, in case of malfunctions, such a combination of malfunction messages occur from which the respective source of the error can be determined. The monitoring devices set forth below are provided for this purpose.

The incoming signal, for example, in the communications channel NK1 is supplied to an amplifier VS1 having a level control and is monitored by a monitoring device having a level control and is monitored by a monitoring device PGU1 in terms of signal level, and triggers an alarm signal in response to an inadmissible deviation from the provided standard level when the gain of the amplifier VS1 is no longer adequate for observing the required level.

The signal held at a constant level in this manner is then checked or, respectively, regenerated by a regeneration circuit RS1 with respect to its clock frequency and with respect to its one density, whereby corresponding alarm signals are triggered in case of inadmissible deviations. The B3ZS code provided for the signals incoming via the communications channel NK1 is based on a rule which provides that a prescribed plurality of "1" pulses is transmitted within a predetermined time interval. The monitoring of this occurs in such a manner that an integrating amplifier continuously forms a time interval from the pulse message which must exceed a prescribed value. When this value is not reached, then a corresponding alarm is triggered.

For recognizing the incoming pulses, as well as for their regeneration and synchronization, the clock frequency of the incoming pulses is required, this being generated by a resonant circuit provided in the regeneration circuit RS1, the resonant circuit being initiated over and over again by the received pulses. An alarm is also triggered in the case of inadmissible deviations of the clock from the prescribed frequency.

The present invention is based on the monitoring and air recognition thereby achievable of predominately those components which are provided for the transmission of the 140 Mbit/s signal, both in the outgoing direction and in the incoming direction, above all else, these components being the multiplexer MUX and the demultiplexer DMX with the connected monitoring devices. In Section 1.2 "Definition" of the aforementioned reference "Bell Communications Research", the functions of these equipment are described and in Section 2.0 "Digital Multiplex Interface Requirements" therein, the prerequisites and auxilliaries are described for a faultless signal transmission. The Section 3.0 "Digital Multiplex Feature and Function Requirements" is concerned with the preconditions for the information transfer between equipment for signal processing of digital signals having different bit rates. The functions of the multiplexers are particularly described in the subsection 3.2 "Multiplexing Functions and Requirements" and the functions of the demultiplexer are described in the subsection 3.3 "Demultiplexing Functions and Requirements". The subsection 3.5 "Monitoring and Controlling Functions and Requirements" is dedicated to the supervision of these functions.

The aforementioned code converter CU1 (in accordance with the German Industrial Standard DIN 44300) forms the binary signals required for the further processing, forming the same from the signal of the communications channel NK1 coded in the ternary B3ZS code. The binary output signal of the code converter CU1 is supplied to a buffer PF1 and is read into the buffer in the clock defined by the code converter CU1 and is intermediately stored therein. Buffers are provided in a corresponding manner for the communications channels NK2 and NK3. The three 45 Mbit/s data arriving by way of the communications channels NK1, NK2 and NK3 are continuously stepped into the three buffers PF and are read out in the 140 Mbit/s clock by the multiplexer MUX connected to the three buffers PF, but are not read out continuously, rather intermittently (void clock) because, first of all, the generations of the three 45 Mbit/s clocks and, secondly, the generation of the 140 Mbit/s clock do not occur synchronously, but independently of one another, and because, in addition, additional bits for the further signal transmission must be fed into the 140 Mbit/s signal. The pulse frame provided for the 140 Mbit/s signals is composed in the multiplexer MUX which comprises the necessary functional units for frame identification word formation (frame alignment) for stuffing identification (stuffing control digits) and, at any rate, for introducing service bits. The clock supply in the multiplexer MUX occurs by way of a crystal-stabilized oscillator whose frequency, together with the stuffing bit rate, is monitored by the stuffing bit rate monitoring device STB.

The frame identification word generated in the multiplexer MUX preceeds each pulse spring. After conversion of the binary output signal of the multiplexer MUX into the CMI-coded signal provided for the 140 Mbit/s signal by the following code converter CUI, the signal is supplied to the transmission channel UK I after amplification by an amplifier VS I. The correct transmission of the frame identifier word, as well as the correct periodicity of the frame identification words, is checked by way of a frame identifier word monitoring device which is alternately connected to the outgoing transmission channel UK I and to the incoming transmission channel UK II by way of a device symbolized as a transfer switch contact UK. The monitoring of the frame identifier words of both the outgoing and incoming signals occurs by way of the device RKU which shall be discussed below with respect to FIG. 2.

The reconversion of the CMI-coded 140 Mbit/s signals incoming by way of the transmission channel UK II which are brought to a constant level by way of an amplifier VS II and are subsequently converted into binary signals by way of a further code converter CU II occurs by way of the demultiplexer DMX which divides the receive signal into three 45 Mbit/s signals on the three outgoing communications channels NK'1, NK'2 and NK'3. A monitoring device RT for checking the frame clock of the receive signal is connected to the demultiplexer DMX and differs from the frame identifier word monitoring device in that it only checks the time grid of the incoming frame by way of cyclically counting off the bits provided for this purpose.

This monitoring occurs in coincidence with the clock generated in the multiplexer MUX. Furthermore, a synchronous alarm device SY is provided, this being coupled to the frame clock monitoring and checking whether the clock of a frame identifier word is in conformity with the frame clock. Furthermore, a device BU is provided for checking the bit errors of the receive signal in the region of the demultiplexer DMX. The device BU recognizes whether the frame identifier word has been modified by transmission disruptions and is constructed as a counter which counts the frequency of the disturbed frame identifier words. A malfunction display is provided for this purpose, this indicating whether the malfunction frequency is greater than $10^{-3}$ (i.e., every thousandth bit is disturbed) are smaller than $10^{-6}$ or lies between these values.

The switch elements required for the further processing are shown at the communications channel NK'1. The demultiplexer DMX separates the 45 Mbit/s signals destined for the three outgoing communications channels and stores them in intermediate memories assigned to these communication channels, from which they are called in by an assigned buffer PF'. Each of the buffers PF' contains a respective voltage-controlled oscillator and is provided with a respectively assigned frequency monitoring device FU' (in the channel NK'1, the device FU'1) which, in a phase-locked control, regulates the frequency of the oscillator to a frame frequency formed at the transmitting side, regulating by way of monitoring the drawn voltage. In the clock defined by the oscillator frequency, the buffers PF' read the assigned signals out of the memories of the demultiplexer DMX. The binary output signals of the buffers PF' are converted by following code converters CU' (shown the converter CU'1) into signals encoded in accordance with the B3ZS code. A level monitoring of the output signal of the communications channel NK'1, for example, occurs by way of a level monitoring device PGU'1 connected to the output of an amplifier VS'.

A code converter which may be additionally employed for the purpose of checking is reference CU, the code converter CU being provided, first of all, for cyclical monitoring of the code converters CU1 inserted into the communications channel NK1, for example, for the incoming signals and, secondly, of the code converter CU'1 inserted, for example, into the communications channel NK'1 for the outgoing signals. Like the code converter CU1, the code converter CU converts B3ZS-coded signals into binary signals. By way of a cyclically-actuated selection switch WS1, the code converter CU is first sequentially switched to the inputs of the code converters CU1 inserted into the incoming communications channel NK1, NK2 and NK3 and, in the same manner, respectively intermittently processes the input signals incoming via these communications channels. As already mentioned, the binary output signals of the code converters CU1 are intermediately stored in the buffer PF1 until called in by the multiplexer MUX. When the selection switch is set to the communications channel NK1, the monitoring code converter CU also accepts the signal, and, in the normal case, converts the same in the same manner as the code converter CU1 and writes the same into the assigned buffer PF which is designed the same as the buffer PF1 into which a comparator VG is connected, the latter being connected by way of a second selection switch WS2 to the buffer PF1 and carrying out a bit-by-bit comparison of the memory contents of the buffers PF and PF1. The selection switches WS1 and WS2 are synchronously actuated by their own clock generator so that they respectively occupy the same channel. In case of a deviation of the memory contents of the two buffers PF and PF1, a corresponding error indication is initiated which states that either the buffer memory PF1 or the code converter CU1 is faulty. The code converters of the communications channels NK2 and NK3 are checked in the same manner in subsequently following steps.

The code converter monitoring device composed of the additional code converter CU, the buffer PF and the comparator VG can also be employed for monitoring the code converter CU' in the outgoing communications channels NK'. In this case, however, a parallel code conversion does not occur, rather the signal supplied from the demultiplexer DMX, as already mentioned, is first temporarily stored in the buffer memory PF'1, for example, and is also simultaneously supplied to the comparator VG by way of time-delay elements VZ. As already set forth, the signals called in from the buffer memory PF'1 and converted by the code converter CU'1 are supplied, first of all, to the amplifier VS'1 for the purpose of transmission, but, on the other hand, are also supplied to the code converter CU by way of the selection switch WS1 during the disconnect period for the communications channels NK'. Immediately after receipt of the signals of the code converter CU'1, the code converter CU effects reconversion, whereupon the reconverted signals are deposited in the buffer PF and are available for the comparator VG. In the comparator, the reconverted signals are compared to the output signals of the demultiplexer DMX which are supplied time-delayed in order to trigger an error alarm given deviations. The delay of the output signals by the delay elements VZ serve for the compensation of the time differences which are caused, first of all, by the conversion in the code converter CU'1 and, secondly, by the reconversion by the code converter CU.

Figure 2:
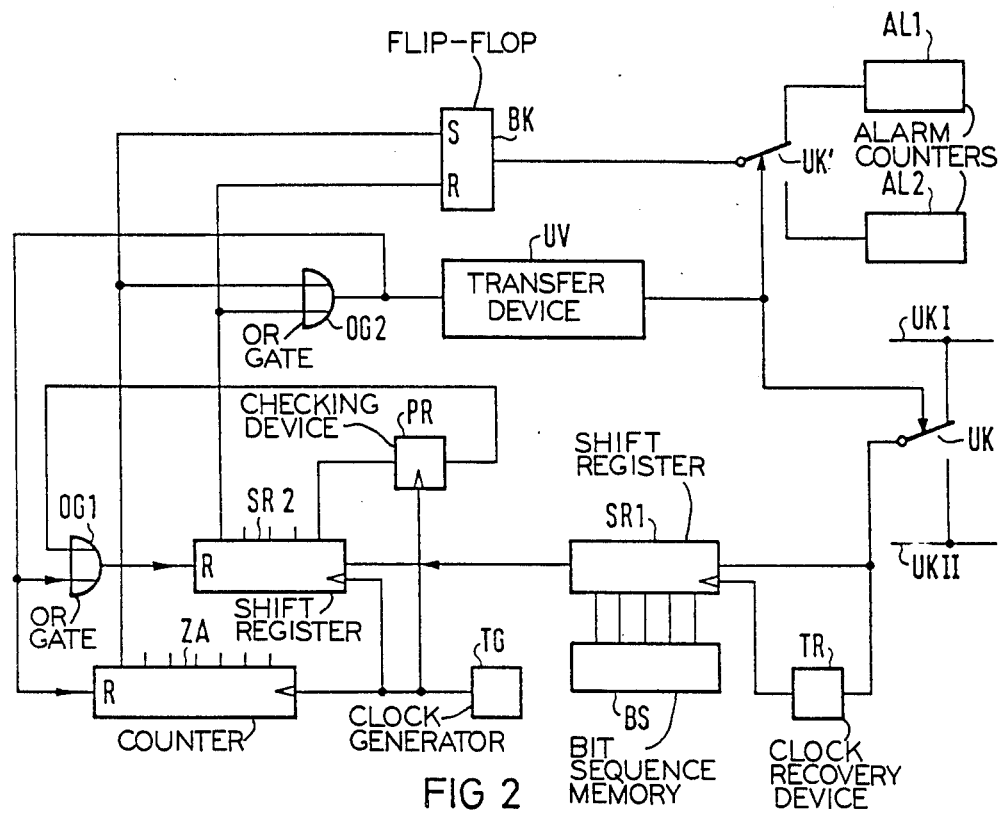
FIG. 2 is a schematic circuit diagram illustrating a monitoring device for the recognition of frame identification words.

FIG. 2 illustrates the monitoring device RKU responsible for error-free operation of the entire system which carries out the frame word monitoring.

The frame word monitoring device RKU is alternately utilized for checking the frame identifier words in the transmission channels UK I, UK II of both transmission directions. This is symbolized by the transfer contact UK which is actuated by a transfer device UV and respectively switches one of the transmission channels UK I or UK II, respectively, to a shift register SR1. For forwarding the shift register SR1, the shift clock is acquired from the transmission clock of the respectively connected transmission channel UK I or UK II, being acquired by way of a device TR for clock recovery. The shift register SR1 has a bit sequence memory VS connected parallel thereto in which the bit sequence of the frame identifier word is stepped in and, whenever the shift register SR1 has recognized a bit sequence corresponding to the frame identifier word, the shift register SR1 sends a setting pulse to a second shift register SR2.

The shift clock of the second shift register SR2 is supplied by a clock generator TG having a clock frequency corresponding to the periodicity of the frame identifier word. A setting pulse triggered by a recognized frame identifier word is sequentially shifted with the clock frequency from an output of a shift register SR2 to the next as "1" information. When a setting pulse fails to arrive, for example, because the frame identifier word was not recognizable, then an information "0" is shifted to the outputs of the shift register SR2. A checking device PR is connected to the first output of the shift register SR2, the checking device PR, likewise synchronized with the clock of the clock generator TG, recognizing a misinformation "0" and in this case, supplying a reset pulse to the reset input of the shift register SR2 on a path by way of an OR gate OG1, whereupon the counting of the setting pulses by the shift register SR2 begins anew.

One of the outputs of the shift register SR2, the fourth output in the present example, is connected to an input of a second OR gate OG2. This output supplies a pulse when a series of four successive setting pulses has arrived and both the correctness of the corresponding frame identifier words and the correctness of their periodicity is therefor proven.

The clock generator TG also additionally actuates a counter ZA which supplies an output pulse after a predetermined plurality of clock pulses, the output pulse being supplied to the second input of the OR gate OG2. The output of the OR gate OG2 is connected to the input of the transfer device UV and actuates the device UV either when a series of four frame identifier words has been recognized or when the required recognition of frame identifier words has not occurred within the time prescribed by the counter ZA. In both instances, the transfer device UV initiates a switching of the shift register SR1 from the respectively connected transmission UK I or UK II to the other transmission channel. The setting pulses of the OR gate OG2 to the transfer device UV are simultaneously fed as reset pulses to, first of all, the reset input of the shift register SR2 via the OR gate OG1 and, secondly, directly to the reset input of the counter ZA.

When a plurality of frame identifier words are not successively recognized or, on the other hand, are not recognized in the proper chronological sequence, i.e., do not appear with the correct periodicity, an alarm is triggered in the following manner.

The fourth output of the shift register SR2 is additionally connected to the reset input of a flip-flop BK and holds the same in its quiescent condition by way of continuously-provided reset pulses as long as the frame identifier words properly arrive. When, however, as has already been set forth above, this order is disturbed within the time duration prescribed by the counter ZA, then a setting pulse is supplied by way of a line leading from the output of the counter ZA to the setting input of the flip-flop BK and an output signal of the flip-flop BK is therefore triggered.

Two counters serving as alarm devices are referenced AL1 and AL2, these being periodically reset after prescribed times in order to achieve a chronological averaging and being assigned to the transmission channels UK I or, respectively, UK II and, in the same sense, having their counting inputs alternately connected to the output of a flip-flop BK by way of the transfer device UV, in particular, by way of a second transfer contact UK'. An alarm regarding in which of the transmission channels UK I or UK II the error which leads to the triggering of the alarm is therefore signalled.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Monitoring apparatus for a switching system apparatus in which a plurality of transmission signals are time-division multiplexed to form a common multiplexed transmission signal, and a common time-division multiplexed received signal is demultiplexed into a plurality of received signals, each of the pulsed messages including a frame identifier word, said apparatus comprising:
   a multiplexer and a plurality of incoming transmission channels connected to said multiplexer;
   a demultiplexer and a plurality of outgoing receiving channels connected to said demultiplexer;
   a common outgoing transmission output connected to said multiplexer and a common incoming receiving input connected to said demultiplexer;
   a plurality of first level monitoring devices each connected to a respective incoming transmission channel for monitoring the signal level of the respective channel;
   a plurality of regeneration circuits each connected in a respective incoming transmission channel as a respective one's density monitor;
   a plurality of first code converters each connected in a respective incoming transmission channel for converting signals of a first code into signals of a second code;
   a stuffing bit rate monitor connected to said multiplexer and operable to insert stuffing bits;
   a plurality of second code converters each connected in a respective outgoing receiving channel for converting signals of the second code into signals of the first code;
   frame identifier word recognition means including clock recovery means connectable to said common outgoing transmission channel and to said common incoming receiving channel;
   a second level monitoring device connected to said clock recovery means for monitoring the level of signals received on said common incoming receiving channel;
   a frame clock monitor connected to said demultiplexer;
   a synchronism monitor connected to said demultiplexer;
   a bit error monitor connected to said demultiplexer;
   a plurality of frequency monitors each connected to a respective outgoing receiving channel; and
   a plurality of third level monitors each connected to a respective outgoing receiving channel.

2. The monitoring apparatus of claim 1, wherein said frame identifier word recognition means further comprises:
   a first shift register connected to said clock recovery means;
   a bit sequence memory storing the frame identifier word connected to said first shift register;
   switch means operable to alternately connect said clock recovery means to said common outgoing transmission output and to said common incoming receiving input;
   a second shift register connected to said first shift register, said first shift register operable upon recognition of a frame identifier word to provide a setting pulse to said second shift register;
   a clock connected to and operable to step said second shift register with the periodicity of the frame identifier words;
   a transfer device connected to operate said switch means;
   a counter connected to said clock and to said transfer device and operable to cause the operation of said transfer device in response to a predetermined maximum waiting time for a frame identifier word; and
   said second shift register connected to said transfer device and operable in response to an uninterrupted set inpulse series of a predetermined length to cause operation of said transfer device.

3. The monitoring apparatus of claim 2, wherein said frame identifier word recognition means further comprises:
   first and second alarm devices connected to said switch means and activated via said switch means in response to operation of said transfer device after said predetermined maximum waiting time measured by said counter.

4. The monitoring apparatus of claim 3, and further comprising:
   an additional first code converter;
   a comparator connected to said additional first code converter; and
   first and second cyclically operated switches, said first cyclically operated switch connected to each of said incoming transmission channels and outgoing receiving channels and connected to said additional first code converter, said second cyclically operated switch connected to said comparator and to each of said incoming transmission channels and outgoing receiving channels,
   said additional first code converter being switchable parallel to said plurality of first code converters by way of said cyclically operated first switch and switchable in series with the corresponding second code converters of the opposite transmission direction by way of said cyclically operated first switch, and said comparator monitoring the equality of the results of the first code converters connected in parallel and the code reconversion of the code converters connected in series.

* * * * *